Dec. 28, 1971 F. ZAPF ET AL 3,631,012
PROCESS FOR PREVENTING OR REDUCING DEPOSITS AND CLOGGING
IN THE CONTINUOUS POLYMERIZATION AND
COPOLYMERIZATION OF OLEFINS BY THE
LOW PRESSURE PROCESS
Filed June 4, 1968
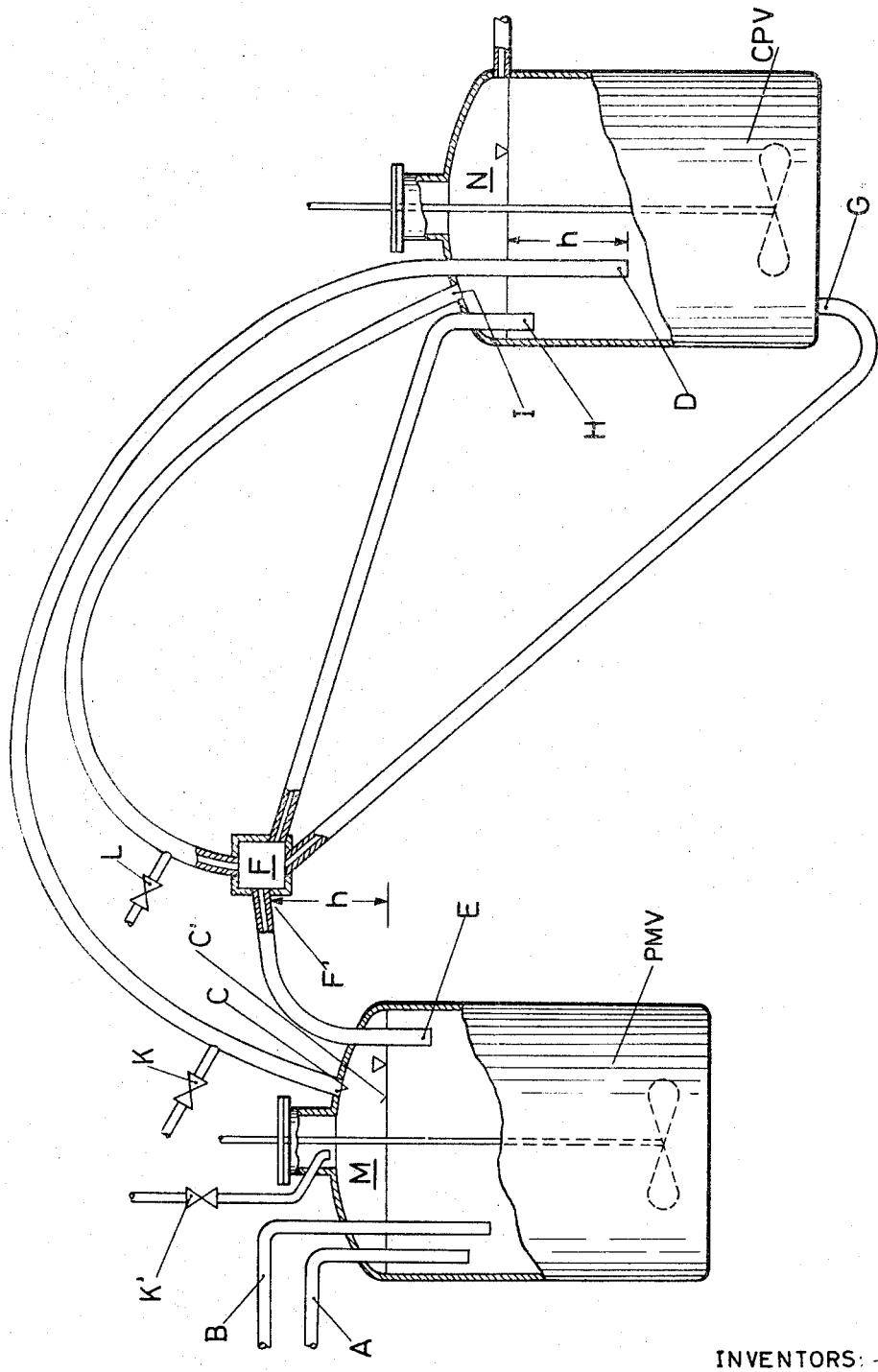
INVENTORS:-
FRANZ ZAPF
WILHELM DUMMER
GÜNTHER LEHMANN
BY *Connolly and Hutz*
    *their* ATTORNEYS United States Patent Office 3,631,012
Patented Dec. 28, 1971

3,631,012
PROCESS FOR PREVENTING OR REDUCING DEPOSITS AND CLOGGING IN THE CONTINUOUS POLYMERIZATION AND COPOLYMERIZATION OF OLEFINS BY THE LOW PRESSURE PROCESS
Franz Zapf, Kelkheim, Taunus, Wilhelm Dummer, Wiesbaden, and Gunther Lehmann, Neuenhain, Taunus, Germany, assignors to Hercules Incorporated, Wilmington, Del.
Filed June 4, 1968, Ser. No. 734,380
Claims priority, application Germany, June 15, 1967, F 52,690
Int. Cl. C08f 1/42, 1/98
U.S. Cl. 260—85.3       10 Claims

ABSTRACT OF THE DISCLOSURE

The present invention relates to a process for preventing or reducing deposits and clogging in the continuous polymerization and copolymerization of olefins by the low pressure process, especially when partially wax-like or sticky products are obtained, in an apparatus comprising at least one main polymerization vessel and at least one continued-polymerization vessel connected in series, both being connected by a system of definitely arranged gas outlet and reaction mixture discharge pipes. The portion of the monomer or monomer mixture, which does not react under the polymerization conditions is continuously withdrawn from the gas space of the main polymerization vessel and introduced into another vessel together with the liquid reaction mixture to complete the polymerization. The gas space in the polymerization vessel is maintained as small and, especially, as constant as possible by the geometry of the apparatus and siphoning-over of the liquid reaction mixture is moreover prevented.

---

The present invention relates to a process for preventing or reducing deposits and clogging in the continuous polymerization and copolymerization of olefins carried out by the low pressure polymerization process.

It is known that α-olefins and diolefins can be homo- or copolymerized in the presence of metallo-organic mixed catalysts by the low pressure process according to Ziegler. The mixed catalysts used consist of compounds of the elements of sub-groups 4 to 6 of the Periodic Table and metallo-organic compounds of main groups 1 to 3 of the Periodic Table. The homo- or copolymerization may be carried out continuously or discontinuously in solution or suspension in inert hydrocarbons or halohydrocarbons. It is, moreover, known that the activity of solid mixed catalysts can be improved by isolating the catalysts and then washing them with inert hydrocarbons, by aging them at room temperature or at elevated temperatures or by adding activators or reactivators. It is further more known that the molecular weight of the polymers or copolymers can be controlled by means of regulating agents, for example hydrogen and the molecular weight distribution can be influenced by means of special mixed catalysts.

Of the two possible methods, the continuous polymerization is preferred to the discontinuous polymerization since it can be carried out in a more economical manner. Unfortunately, the continuous polymerization must be interrupted often due to troubles caused by deposits and the formation of crusts in the polymerization plants. These crusts and precipitates formed in certain areas of the polymerization vessel and in the pipes may be caused by different reaction conditions or by deposits in the pipes through which the reaction mixture containing the catalyst is transported. These deposits are formed particularly at the pipe sockets of the polymerization vessels and in the pipes leading from the polymerization vessel to the vessel wherein the polymerization is continued, leading to the decomposing vessel, in particular when wax- or rubber-like, sticky polymers are obtained by the continuous polymerization.

We have now found a process for preventing and reducing deposits and clogging in the continuous preparation of polymers or copolymers from olefins containing from 1 to 8 carbon atoms in the main chain, or diolefins containing from 4 to 15 carbon atoms, or copolymers of mixtures of both, conducted under a pressure of from 0 to 30 atmospheres and at temperatures in the range of from $-30$ to $+120°C$., in the presence of compounds of titanium or vanadium and aluminium-organic compounds which may also contain halogen atoms, and in an inert dispersing agent, in at least one polymerization vessel and in at least one vessel connected in series in which the polymerization is continued, which process, as illustrated by the accompanying drawing, comprises:

(a) Withdrawing the proportion of the gaseous monomer or monomer mixture, which has not been polymerized under the reaction conditions in the main polymerization vessel PMV and which enters at A, entirely and free from liquid from the gas space M of the polymerization vessel, which is equal or inferior to 20% by volume of the polymerization vessel, through the gas outlet pipe C–D, arranged as topmost as possible in the polymerization vessel and introducing it at D into the reaction mixture contained in another vessel (CPV) in which the polymerization is continued to complete the polymerization, the volume of M being maintained constant and as small as possible by immersing the gas outlet pipe C–D at D in the reaction mixture contained in the vessel in which the polymerization is continued, by exactly the height $h$ which is identical with the distance $h$ between F′ and the surface C′ of the reaction mixture in the main polymerization vessel, and (b) Simultaneously introducing the liquid reaction mixture withdrawn from the main polymerization vessel continuously into the reaction mixture of the vessel in which the polymerization is continued, at G or H through pipe E–G or E–H, the diameter of which is widened at F to prevent siphoning over and which is immersed to E below the surface of the reaction mixture.

An apparatus suitable for use in carrying out the process of this invention is illustrated diagrammatically by way of example in the accompanying drawing. The drawing presents the flow diagram of the continuous polymerization of the invention. The arrangements of the polymerization vessel (PMV), the vessel in which the polymerization is continued and finished (CPV) and the corresponding pipes, is a particularly preferred embodiment of the invention. It is, however, also possible to connect several polymerization vessels to several other vessels in which the polymerization is continued and finished. Moreover, the polymerization vessel and the vessel in which the polymerization is continued may both be arranged on the same level. At A, the gaseous monomer or monomer mixture is introduced into the polymerization vessel. It is, however, also possible to introduce the monomer from below into the polymerization vessel. The dispersing agent and the catalyst components are fed into the polymerization vessel through pipe B. In this case, the catalyst components may be added together or separately in the form of solutions or suspensions. At C the gaseous monomer or monomer mixture which has not been reacted during the polymerization in the main vessel, is withdrawn, after separation of the reaction mixture, through pipe C–D that has to be arranged as topmost as possible in the polymerization vessel, and at D it is introduced for further polymerization below the surface of the reaction mixture in the vessel in which the polymerization is continued.

The reaction mixture of the main polymerization vessel is withdrawn at E through pipe E–G or pipe E–H and introduced into another vessel in which the polymerization is continued. Pipe E–G or E–H is widened at the highest possible point F, which provides an additional gas space above the discharging reaction mixture. The widened portion of the pipe at F is, for example, advantageously obtained by flanging to the pipe a sight glass or a pipe section, the diameter of which is larger than that of pipe E–G or E–H. The widened pipe section F prevents, together with the second gas outlet pipe F–I, a siphoning-over, on the one hand, and brings about a continuous discharge of the reaction mixture from the polymerization vessel, on the other hand.

At the points K and L of gas outlet pipes C–D and F–I as well as at the point K′ of the polymerization vessel, there are arranged valves for letting in inert gases, such as nitrogen, or rare gases or hydrogen destined for controlling the molecular weight of the polymer.

The continuous polymerization process of the invention has proved to be especially suitable for preparing homo- or co- or block copolymers having from 1.5 to 20%, preferably from 2.5 to 8% and especially preferably from 2.5 to 6%, by weight, calculated on the total polymer, of proportions that are soluble under the polymerization conditions. The troubles occurring in the continuous polymerization in the presence of soluble proportions, without applying the methods of the invention, are not only due to the size of these proportions, but also to their quality, especially to their molecular weight and, moreover, to the catalyst sysem. The process of the invention can be carried out under conditions such that the resistance in the pipes can be neglected. This requirement is met, among other methods, by choosing the correct dimensions of pipes and the appropriate solids content of the reaction mixture.

It is very surprising that the partial step (a) of the invention, i.e. a very easy separation of the gaseous monomer or monomer mixture which has not been reacted in one polymerization step, from the reaction mixture considerably reduces the occurrences of troubles in the continuous polymerization.

The decisive condition for carrying out the continuous polymerization of the invention without troubles is a gas space M in the polymerization vessel, and from which the unreacted proportions of the gaseous monomer or monomer mixture are continuously withdrawn at C. Space M is as small as possible, has the most constant volume possible and is free from liquid proportions of the reaction mixture. This simultaneously requires that the level C′ of the reaction mixture which is the lower limit to the gas space, is maintained as constant as possible. In order to meet these two requirements, one end of the gas outlet pipe C–D has to be immersed at D into the reaction mixture in the vessel in which the polymerization is continued, by exactly the height $h$ which corresponds to the distance $h$ between the surface C′ of the reaction mixture and point F′. This measure ensures that the gas space M has a volume equal or inferior to 20% by volume, preferably 1 to 8% by volume, of the volume of the polymerization vessel and that the reaction mixture of the polymerization vessel does not penetrate into the gas outlet pipe at C nor does the surface C′ of the reaction mixture fall to the level of the outlet pipe at E.

When the reaction mixture containing the catalyst is discharged at E from the main polymerization vessel through pipe E–G or E–H starting below the surface of the reaction mixture, ascending and then descending towards the vessel in which the polymerization is continued, without taking special measures, it may easily occur that the pipe section descending towards the vessel in which the polymerization is continued, exercises a siphoning effect. This effect causes the surface of the reaction mixture in the polymerization vessel to be lowered and lifted periodically and thus gives rise to an irregular polymerization course. At the portion of the vessel wall that is only temporarily covered by the liquid reaction mixture and to which catalyst particles adhere, there are formed layers of polymer which hamper the dissipation of the polymerization heat. These layers may very quickly accumulate because of the poor heat dissipation in a polymerization of the monomer directly from the gaseous phase to form very troubling, hard and sintered deposits.

Thus very small amounts of polymeric by-product having properties which differ considerably from those of the main product of the polymerization are formed in this manner and occasionally crumble away, thereby giving end products of questionable utility in important fields of application. For example, because the melt properties of such by-products differ, owing to the melt properties of such by-products, which differ from those of the main product, blown articles and sheets or films show inhomogeneities (spots, graining, rough surfaces) which render them useless.

In order to achieve uniform polymerization products, it has proved to be very advantageous to lead the pipe which leaves the main polymerization vessel at E, into the vessel in which the polymerization is continued, at G instead of H. Thus, no deposits are formed at the bottom of the vessel (CPV) and the whole reaction mixture necessarily flows through the whole vessel in a uniform manner.

It is possible to introduce an inert gas, such as nitrogen or a rare gas, or if required a gaseous molecular weight controlling agent, for example hydrogen, through valves which are positioned at K′ at the stirrer socket of the polymerization vessel and at K and L on the gas outlet pipes C–D and F–I. It has proved to be very advantageous in several regards to introduce the gases at these points since the undesired siphoning effect in pipe section F–G or F–H is prevented even at a high flow rate of the dispersion. It is, moreover, possible to dilute the unreacted gaseous monomer or monomer mixture to be removed from the polymerization vessel, in the gas outlet pipe C–D and thus to avoid the risk that this pipe is clogged by the polymer formed therein. It is especially advantageous to introduce these gases at K or K′ when the monomer has been reacted to a large extent in the polymerization vessel so that only relatively small amounts of gas have to be withdrawn through pipe C–D. Unless the flow rate of the gas is increased in this case, there is a great risk that the unreacted monomer polymerizes at the phase boundary of gas/liquid within pipe C–D above D and the polymer formed obstructs this gas outlet pipe.

By introducing an inert gas or hydrogen at L, the aforesaid effect of the widened pipe section at F can be improved, undissolved gaseous monomers can be prevented from being sucked off from the gas space N of the vessel in which the polymerization is continued, and the level of the reaction mixture can be better controlled.

Although it is possible to polymerize ethylene and higher α-olefins continuously in inert dispersing agent in the presence of simple, highly stereo-specific catalyst systems, for example mixtures of $TiCl_3$ and dialkyl-aluminium chlorides, and optionally a regulating agent, such as hydrogen, without further additives in a comparatively smooth manner without practicing the present invention, the aforementioned difficulties are exceedingly troublesome in continuously carrying out other processes. For example, the practice of the invention has proved to be very advantageous in polymerizations in which the heavy-metal component of the catalyst consists at least partially of especially small particles of less than $10\mu$ in diameter and, in particular, when partially wax-like or sticky polymers are obtained. Products of this type are formed by copolymerizations in which the incorporation of the monomers is statistic and irregular and, therefore, hinders the crystallization of the polymer chains. This also applies to block copolymerizations, especially when statistically irregular chain units may be formed thereby. Such products are formed by homopolymerizations of propylene and higher α-olefins in the presence of only moderately stereospecific catalysts. They are formed by polymerizations of ethylene and higher α-olefins when the heavy-metal component of the catalysts consists of at least two different components, for example of $TiCl_3$ and $TiCl_4$. Additions of polar compounds, such as alcohols, acids or amines, to the catalyst or the components thereof or to the polymerization mixture have, in many cases, such an effect that portions of an originally uniform catalyst are modified so that the polymerization is carried out with mixtures of different catalyst components. Heavy-metal components comprising especially small particles, are formed, for example, in known manner by grinding coarse particles or by pre-treating the catalyst with higher α-olefins containing 4 and more carbon atoms in the main chain, such as n-butene-(1), n-hexene-(1), n-nonene-(1), n-tetradecene-(1) or with mixtures of olefins. In the continuous homo- or copolymerization according to the process of the invention, the catalysts, activators, monomers, dispersing agents and other additives, if desired regulating agents, may be fed continuously in known manner into one or several polymerization vessels which are connected in parallel order or in series. It is, however, also possible to feed different monomers or monomer mixtures alternately to prepare block copolymers.

Suitable for the continuous polymerization or copolymerization of the invention are olefins containing from 1 to 8 carbon atoms in the main chain, for example ethylene, propylene, n-butene-(1), n-pentene-(1), n hexene-(1), 4-methylpentene-(1), 4-phenylpentene-(1), 4-cyclohexylpentene-(1), or diolefins having from 4 to 15 carbon atoms, such as hexadiene-(1,4), cyclopentadiene, isoprene, dicyclopentadiene, 3' - methyl - 2' - butenyl-norbornene, methyl - tetra - hydroindene, 5-methylene-norbornene - (2), 5 - ethylidene - norbornene - (2), 5-cyclohexenyl-norbornene-(2), 1,5-cyclooctadiene.

Moreover, the process of the invention also applies to the copolymerization of said olefins with said diolefins.

As mixed catalysts suitable for the continuous polymerization process of the invention there are used the known reaction products of titanium halides, such as $TiCl_3$, $TiCl_4$, $TiBr_3$, $TiBr_4$, $TiI_3$ and $TiI_4$ or vanadium halides such as $VCl_3$, $VCl_4$, $VOCl_3$ with aluminium-organic compounds such as $(C_2H_5)_3Al$, $(C_3H_7)_3Al$, $(C_4H_9)_3Al$, $Al(isoprenyl)_3$, $(C_2H_5)_2AlCl$, $C_2H_5AlCl_2$, $(C_2H_5)_{1.5}AlCl_{1.5}$. The mixed catalysts may also contain more than one heavy-metal component. By highly stereospecific catalysts is meant catalysts, which give during polymerization substantially only one of the possible stereo-isomeric polymers for example mixed catalysts of $TiCl_3$ and $(C_2H_5)_2AlCl$.

A moderate stereospecificity is, for example, shown by catalyst mixtures consisting of $TiCl_3$ and $(C_2H_5)_3Al$.

If desired, the known activators or reactivators can be added to the aforesaid mixed catalysts to increase the activity or the stereospecificity. In some cases, additions of separating agents have proved to be suitable.

As suitable dispersing agents for the continuous polymerization or copolymerization of the invention there are aliphatic or alicyclic or aromatic hydrocarbons which may contain halogen atoms, for example pentane, hexane, heptane, isooctane, petrol ether, hydrogenated sulfur-free diesel oil fractions, cyclohexane, methylcyclohexane, benzene, toluene, methylene chloride, ethyl chloride, 1,2-dichloroethane, 1,2-dichloropropane and chlorobenzene.

The polymers and the copolymers are worked up in known manner.

The following examples serve to illustrate the present invention but they are not intended to limit it thereto, the percentages being by weight unless stated otherwise.

EXAMPLE 1

The following continuous polymerization was carried out using three polymerization vessels and another vessel in which the polymerization was continued, all the vessels being made of stainless steel and having a capacity each of 330 liters. The polymerization vessels were connected to the vessel in which the polymerization was continued by means of pipes shown in the drawing. In this experiment, the pipes differed from those shown in the drawing in that the reaction mixture discharge pipes E–H were omitted and the individual pipes having the same function, i.e. gas outlet pipes C–D and F–I and the reaction mixture discharge pipes E–G were combined in a common pipe immediately before entering the vessel in which the polymerization was continued. In this manner, the three polymerization vessels were connected in a parallel order to a common vessel in which the polymerization was continued. A gaseous ethylene-butene-(1) mixture which had not been reacted in the polymerization vessels was separated from the liquid reaction mixture and withdrawn through pipes C–D and the level C' was maintained constant by immersing pipe C–D into the reaction mixture in polymerization vessel CPV by the height $h$.

16.25 kilograms per hour of ethylene, 16.3 grams per hour of n-butene-(1), 66 liters per hour of a hydrogenated sulfur-free diesel oil fraction boiling from 140° to 160° C., 330 millimols per hour of $TiCl_3$, 132 millimols per hour of $TiCl_4$, 198 millimols per hour of $(C_2H_5)_{1.5}AlCl_{1.5}$ and 0.8 liter per hour of n-butanol were continuously fed into each of the three polymerization vessels. The polymerization temperature was adjusted to about 80° C. and the pressure to about 1.5 atmospheres. Through valve K' 40 liters per hour of nitrogen were introduced.

The polymerization yielded 95 to 96% of crystalline ethylene-butene-copymer having a density of from 0.943 to 0.947, a melt index $i_5$ of $1.2 \pm 0.5$ grams/10 minutes (measured at 190° C. after granulation) and from 4 to 5% of portions soluble under the polymerization conditions.

The continuous polymerization of the invention was interrupted after 520 hours for a check. During these 520 hours, no troubles occurred. The walls of the vessels, the sockets and pipes leading away from the vessels only showed slight deposits of polymer.

The continuous polymerization process of the invention as carried out in the above example is compared hereinafter with the hitherto used continuous polymerization processes and processes in which only some combinations of the methods of this invention have been applied, in the form of comparative Examples 1 to 4.

COMPARATIVE EXAMPLE 1

The apparatus used in this example differed from that used in Example 1 in the following:

Gas outlet pipes C–D and F–I, reaction mixture discharge pipe E–G and gas inlet valves K, K' and L were not provided for in this apparatus. Moreover, there was no widened pipe section at F. The reaction mixture was discharged from the three polymerization vessels into vessel CPV together with the unreacted gaseous monomer mixture through pipes E–H which, however, did not start at E from the polymerization vessels, but only started from the covers thereof. The polymerization was effected using the amounts of monomer, catalysts and dispersing agents disclosed in Example 1, without the nitrogen feed.

After 3 hours, the continuous polymerization had to be interrupted for the first time, since thick hard wax-like deposits had been formed at the surfaces of the vessels in the gas space M, at the walls of the vessels, which were not always covered or reached by liquid, at the vessel sockets, at the upper portions of the stirrer shaft and in the reaction mixture discharge pipes. Pipes E–H were clogged by the formation of these deposits. The pipes were dismantled, cleaned mechanically and burnt out. Subsequently, the continuous polymerization was continued, while trying without success to prevent the formation of deposits and thus clogging by modifying the reaction parameters, for example the temperature and by slightly modifying the ratio of titanium IV/titanium III/ethylaluminium sesquichloride as well as the amounts of butene-(1) and butanol. Every 2 to 3 hours, the apparatus was clogged and the process had to be interrupted. Even by insulating the pipes E–H, it was not possible to prevent clogging due to wax-like deposits; because very hard solid deposits were formed thereby.

These experiments show that it is not possible under these conditions to carry out a continuous polymerization with polymers containing from 4 to 5% of proportions that are soluble under the polymerization conditions.

COMPARATIVE EXAMPLE 2

The polymerization was carried out using the same apparatus as disclosed in Comparative Example 1, except the following modifications: The reaction mixture discharge pipes were extended until they were immersed by 50 centimeters below the surface of the mixture at E in the polymerization vessels.

Moreover, for separately discharging the gaseous unreacted monomer mixture and the liquid reaction mixture, gas outlet pipes C–D were arranged at C in each of the three polymerization vessels. They were combined in a single pipe in a manner analogous to the reaction mixture discharge pipes and then introduced at D into vessel CPV by 50 centimeters below the surface of the reaction mixture. The polymerization was carried out under conditions analogous to Example 1.

By means of the above modifications, the number of obstructions in the reaction mixture discharge pipes E–H could be reduced considerably. The period of operation could be increased from 2–3 hours to 5–7 hours. However, the modifications did not ensure a constant level C' of the reaction mixture in the polymerization vessels nor a sufficiently small gas space M. The widely varying level was caused by the siphoning effect of reaction mixture discharge pipes E–H descending towards the polymerization vessel. As a result of these variations of level, thick deposits of product were formed at the upper portions of the polymerization vessel walls which had been covered or reached at periodical intervals by liquid and gas, at the upper portion of the stirrer shaft as well as at the lower portion of gas outlet pipe C–D. These deposits hampered a satisfactory dissipation of polymerization heat. As a consequence thereof, parts of the deposits melted off, formed lumps and quickly obstructed the discharge pipes.

COMPARATIVE EXAMPLE 3

The polymerization was carried out in a manner analogous to Example 1. Since the operation period was not satisfactory, the apparatus used in Comparative Example 2 was modified as follows: In order that the level C' of the reaction mixture in the polymerization vessels can be better maintained constant, the pipe diameters of discharge pipes E–H were considerably widened at thier highest point at F. For this purpose, it was especially suitable and simple to flange a simple T-shaped pipe having an appropriate diameter, to the pipes. Simultaneously, an additional pipe F–I was installed starting from the widened section at F. By means of this modified apparatus, the previous periodical variations of surface C' could be prevented and the formation of thick deposits on the walls of the vessels could be very much reduced. Clogging mainly occurred then in gas outlet pipe C–D, especially in the portion immersed in the reaction mixture of vessel CPV. The operation period could be increased to 10–20 hours.

COMPARATIVE EXAMPLE 4

The polymerization was carried out in the manner analogous to Example 1. To prevent clogging in gas outlet pipes C–D and F–I, gas inlet valves were mounted to the pipes at K and L. 40 liters per hour of nitrogen was passed at K instead of K' through the gas outlet pipes. Using the apparatus arranged in this manner it was possible to carry out the continuous polymerization for about 150 hours without appreciable troubles. After 150 hours the polymerization was interrupted. On inspecting the apparatus, some considerable deposits were still found on the walls of the vessels in gas space M (dome) of the polymerization vessel.

The above Comparative Examples 1 to 4, in connection with Example 1, show that only the combination of all measures of the invention permit the continuous polymerization under the above-mentioned conditions. They, furthermore, show that it is surprisingly possible to carry out continuous polymerization processes only with the help of merely technical measures even for the manufacture of partially wax-like and sticky polymers.

EXAMPLE 2

A polymerization vessel having a capacity of 180 liters, made of stainless steel, was connected in series to two additional polymerization vessels having the same capacities, while using pipes E–H each having a widened section at F, pipes C–D and F–I as well as valves K'. Through valve K' at the polymerization vessel, 40 liters per hour of nitrogen were introduced.

To carry out a continuous polymerization, 22.5 liters per hour of a hydrogenated sulfur-free diesel oil fraction boiling from 140° to 160° C., 90 millimols per hour of a highly stereospecific $TiCl_3$, 180 millimols per hour of diethylaluminium monochloride, 3.75 kilograms per hour of propylene and 71 grams per hour of ethylene were fed in the polymerization vessel at 50° C. and under a pressure of from 3 to 3.5 atmospheres. The polymerization period was 220 hours. No troubles occurred during this time. After the polymerization had been terminated, no appreciable deposits were formed in the vessels and pipes.

For checking purposes, samples of the dispersion were taken from time to time from the polymerization vessel and the two vessels in which the polymerization was continued, and were worked up in the following manner for determining the soluble proportion.

Under an atmosphere of nitrogen the catalyst was decomposed by adding n-butanol. Subsequently, the sample was washed three times with water at 50° C. and then filtered off with suction. The residue was then stirred for 15 minutes at 50° C. with the same volume of gasoline and filtered off with suction. The remaining solvent of the residue was eliminated by evaporation the residue dried in the drying cabinet and then weighed. This residue represented the crystalline proportion of the polymer.

The mother liquors obtained were combined and the solvent was evaporated therefrom. The evaporation residue thus obtained is referred to as the proportion of the total polymers, which is soluble under the polymerization conditions. The soluble proportions of this example were in the range of from 2.7 to 3.6%.

COMPARATIVE EXAMPLE 5

A continuous copolymerization was carried out as in Example 2 with 3.75 kilograms of propylene and 71 grams of ethylene per hour at 50° C. and under a pressure of 3.4 atmospheres, while using the vessels of Example 2, except that, in a manner analogous to Comparative Example 1, pipes C–D, F–I and E–G, valves K, K' and L and the widened pipe sections at F were not provided for. No nitrogen was introduced. In a manner analogous to Comparative Example 1, the reaction mixture was discharged from the polymerization vessel and transported through the simple pipes E–H into vessel I and then into vessel II, in which the polymerization is continued and finished. The polymer proportions which were soluble under the polymerization conditions were in the range of from 2.5 to 3.4% in the main polymerization vessel and in vessel I. The polymerization had to be interrupted after 12 hours since the pipe leading from the main polymerization vessel to vessel I was clogged. In the pipes leading from vessel I to vessel II and in the cover sockets above E and at H in the polymerization vessel and the two other vessels, thick polymer deposits had been formed.

EXAMPLES 3 to 8

While using the apparatus of Example 2 and adding the same amounts of propylene under the polymerization conditions disclosed in Example 2, the statistical copolymerizations and block copolymerizations of propylene with ethylene, n-butene-(1), n-hexene-(1), 4-methylpentene-(1) and 4-phenylpentene-(1) as comonomers were carried out as disclosed in the following table. In these examples, the different amounts of comonomers were introduced either into the polymerization vessel or into the first vessel connected in series in which the polymerization was continued. The polymerizations were generally carried out at 50° C. and under a pressure of from 3 to 3.5 atmospheres in the presence of the amounts of catalyst and dispersing agent mentioned in Example 2. Moreover, 40 liters per hour of nitrogen was introduced through valve K'. In some examples, hydrogen was also introduced through valve K in amounts ranging from 0.1 to 1.3% by volume, calculated on the amount of propylene used, for controlling the molecular weight. The proportions which were soluble under the polymerization conditions were determined in the manner disclosed in Example 2.

the second reaction zone at a point below the upper level of the liquid reaction mixture, withdrawing liquid reaction mixture from the first reaction zone from a point below the upper level of the liquid reaction mixture therein, transporting the reaction mixture to the second reaction zone by a conduit and introducing it into the second reaction zone at a point below the upper level of the liquid reaction mixture contained therein, said conduit for carrying liquid reaction mixture from the first to the second reaction zone having a segment thereof widened to form a gas space at a location outside the first and second reaction zones and a second conduit freely communicating the gas space with the upper portion of the second reaction zone, The gaseous monomer reactants from the first reaction zone being introduced into the second reaction zone at a distance below the level of liquid reaction mixture contained therein equal to the distance between the level of the liquid in the first reaction zone and the highest point attained by the liquid reaction mixture during its transfer from the first to the second reaction zone thereby maintaining substantially constant the volume of the upper portion of the first reaction zone.

TABLE

| Example | Monomers — Olefin | Monomers — Point at which it was added | Comonomer, Amount in percent by volume, calculated on propylene | Hydrogen — Point at which it was added | Hydrogen — Percent by volume calculated on propylene | Proportions soluble under polymerization conditions, percent by weight — PMV | CPV I | CPV II | Polymerization period (hours) |
|---|---|---|---|---|---|---|---|---|---|
| 3 | Ethylene | PMV | 1.0 | PMV | 0.1 | 2.8–3.3 | 2.7–3.6 | (¹) | 124 |
|   | Propylene | PMV | | | | | | | |
| 4 | Ethylene | CPV I | 15 | CPV I | 1.3 | 1.9–2.4 | 3.8–4.3 | 3.7–4.6 | 320 |
|   | Propylene | PMV | | | | | | | |
| 5 | n-Butene-(1) | PMV | 9 | PMV | 1.0 | 12.0–13.2 | 11.8–13.9 | (¹) | 102 |
|   | Propylene | PMV | | | | | | | |
| 6 | n-Hexene-(1) | PMV (30° C.) | 11 | | | 1.9–2.4 | 4.8–5.6 | ²5 | 210 |
|   | Propylene | CPV I (50° C.) | | | | | | | |
| 7 | 4-methyl-pentene-(1) | PMV | 3 | | | 3.5–5.3 | (¹) | (¹) | 182 |
|   | Propylene | PMV | | | | | | | |
| 8 | 4-phenyl-pentene-(1) | PMV | 5 | | | 4.8–5.7 | (¹) | (¹) | 98 |
|   | Propylene | PMV | | | | | | | |

¹ Not measured.
² About.

NOTE.—PMV=polymerization vessel. CPV I/II=vessel I/II in which polymerization is continued and finished.

What is claimed is:

1. In the process for continuous production of polymers or copolymers from monomers selected from the group consisting of olefins having from 1 to 8 carbon atoms in the main chain, diolefins having from 4 to 15 carbon atoms or mixtures thereof under a pressure of 0 to 30 atmospheres and a temperature between −30° to 120° C., in the presence of a mixed catalyst comprising a mixture of (a) compounds of titanium or vanadium and (b) aluminum organic compounds, in an inert dispersing agent, the improvement of reducing deposits and clogging by a process comprising conducting the reaction in at least one first reaction zone wherein polymerization is begun, which zone comprises an upper and a lower portion, the lower portion containing a liquid reaction mixture and the upper portion containing gaseous monomer reactants which have not polymerized under the reaction conditions in the first reaction zone, the upper portion containing the gaseous monomer reactants being up to 20% by volume of the first reaction zone, and at least one second reaction zone wherein polymerization is completed, which zone comprises an upper and a lower portion, the lower portion containing a liquid reaction mixture and the upper portion containing gaseous monomer reactants, introducing monomer and catalyst into said first zone, withdrawing gaseous monomer reactants free of liquid from the upper portion of the first reaction zone at the topmost point as possible, and introducing the gaseous monomer reactants through a conduit into 2. A process as claimed in claim 1, wherein 1.5 to 20% by weight of proportions which are soluble under the polymerization conditions are formed by the polymerization or copolymerization, calculated on the total polymer.

3. A process as claimed in claim 1, wherein 2.5 to 8% by weight of proportions which are soluble under the polymerization conditions are formed by the polymerization or copolymerization, calculated on the total polymer.

4. A process as claimed in claim 1, wherein 2.5 to 6% by weight of proportions which are soluble under the polymerization conditions are formed by the polymerization or copolymerization, calculated on the total polymer.

5. A process as claimed in claim 1, wherein there are used mixed catalysts which are modified by an addition of alcohols, amines or carboxylic acids.

6. The process according to claim 1 wherein an inert gas is introduced into the upper portion of the first reaction zone, into the conduit employed to conduct the gaseous monomer reactants from the first to the second reaction zone or into the second conduit communicating between the gas space and the upper portion of the second reaction zone to prevent the formation of crusts and clogging.

7. The process according to claim 1 wherein hydrogen is introduced into the upper portion of the first reaction zone, into the conduit employed to conduct the gaseous monomer reactants from the first to the second reaction zone or into the second conduit communicating between the gas space and the upper portion of the second reaction zone to control the molecular weight of the polymer or copolymer.

8. The process according to claim 1 wherein the upper portion of the first reaction zone is from 1 to 8 percent by volume of the volume of the first reaction zone.

9. A process as claimed in claim 1, wherein there are used mixed catalysts wherein the titanium or vanadium component is present in 2 or more valencies.

10. A process as claimed in claim 1, wherein there are used mixed catalysts wherein the titanium or vanadium component contains particles having a diameter of less than 10μ.

No references cited.

JOSEPH L. SCHOFER, Primary Examiner

E. J. SMITH, Assistant Examiner

U.S. Cl. X.R.

23—285; 260—80.78, 88.2, 93.1, 93.7, 94.3, 94.9 B, 94.9 C, 94.9 E, 94.9 P

PO-1050
(5/69)

UNITED STATES PATENT OFFICE
CERTIFICATE OF CORRECTION

Patent No. 3,631,012     Dated December 28, 1971

Inventor(s)   Franz Zapf, et al.

It is certified that error appears in the above-identified patent and that said Letters Patent are hereby corrected as shown below:

Col. 4, lines 17 & 18 of printed patent;
    page 6, line 28 of spec. - delete after word by-products   -- differ, owing to the
    melt properties of such by-products which --

Signed and sealed this 28th day of November 1972.

(SEAL)
Attest:

EDWARD M. FLETCHER, JR.         ROBERT GOTTSCHALK
Attesting Officer                Commissioner of Patents